(No Model.)

W. F. MARTIN.
MACHINE FOR BEATING UP NAPPED HATS.

No. 275,925. Patented Apr. 17, 1883.

WITNESSES:

INVENTOR:
W. F. Martin
BY
ATTORNEYS.

UNITED STATES PATENT OFFICE.

WILLIAM F. MARTIN, OF DANNEMORA, ASSIGNOR TO HIMSELF AND WILLIAM CARROLL, OF NEW YORK, N. Y.

MACHINE FOR BEATING UP NAPPED HATS.

SPECIFICATION forming part of Letters Patent No. 275,925, dated April 17, 1883.

Application filed August 31, 1882. (No model.)

*To all whom it may concern:*

Be it known that I, WILLIAM F. MARTIN, of Dannemora, in the county of Clinton and State of New York, have invented a new and useful Improvement in Machines for Beating up Napped Hats, of which the following is a full, clear, and exact specification.

My improvements relate to machines for removing the cotton which, in the process of manufacturing napped hats, is mixed with the fur and is removed, after the scalding operation, usually by hand, the invention consisting of the combination of reciprocating beaters and a moving bed, as hereinafter described and claimed.

Reference is to be had to the accompanying drawings, forming part of this specification, in which similar letters of reference indicate corresponding parts in both the figures.

Figure 1:
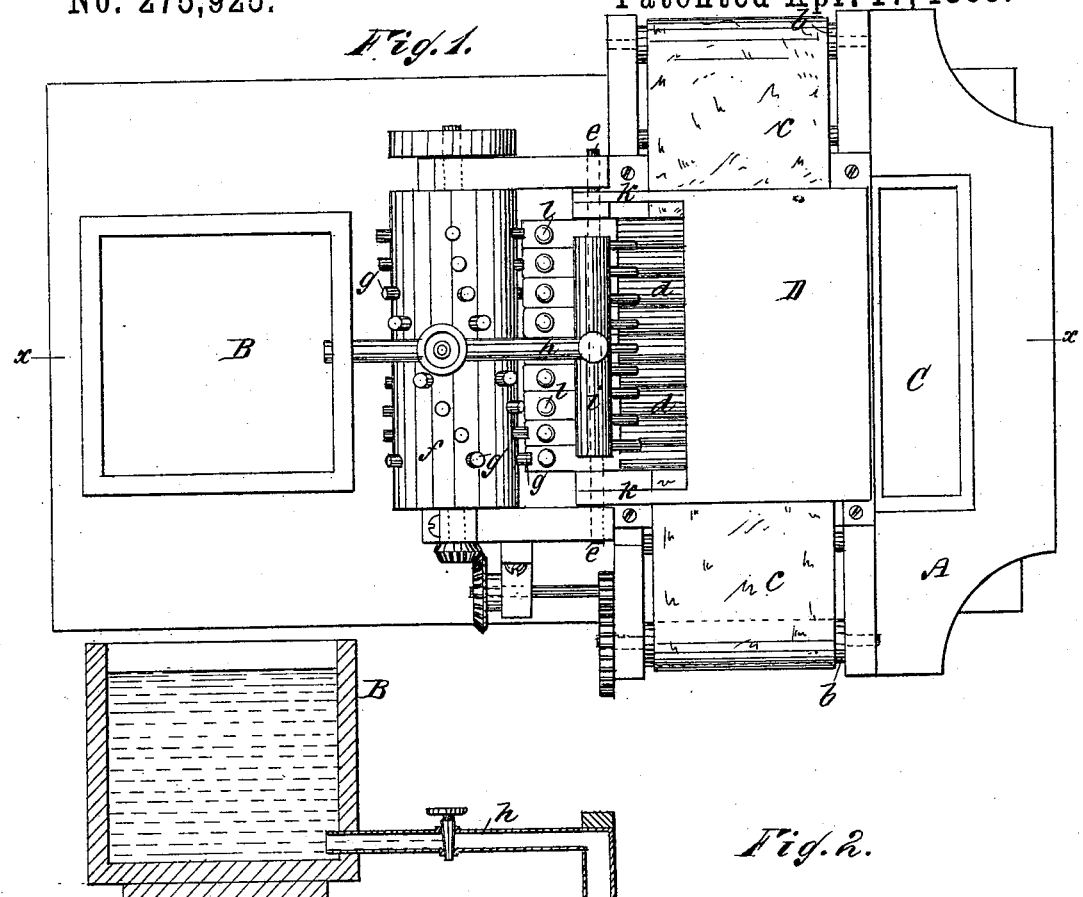
Figure 2:
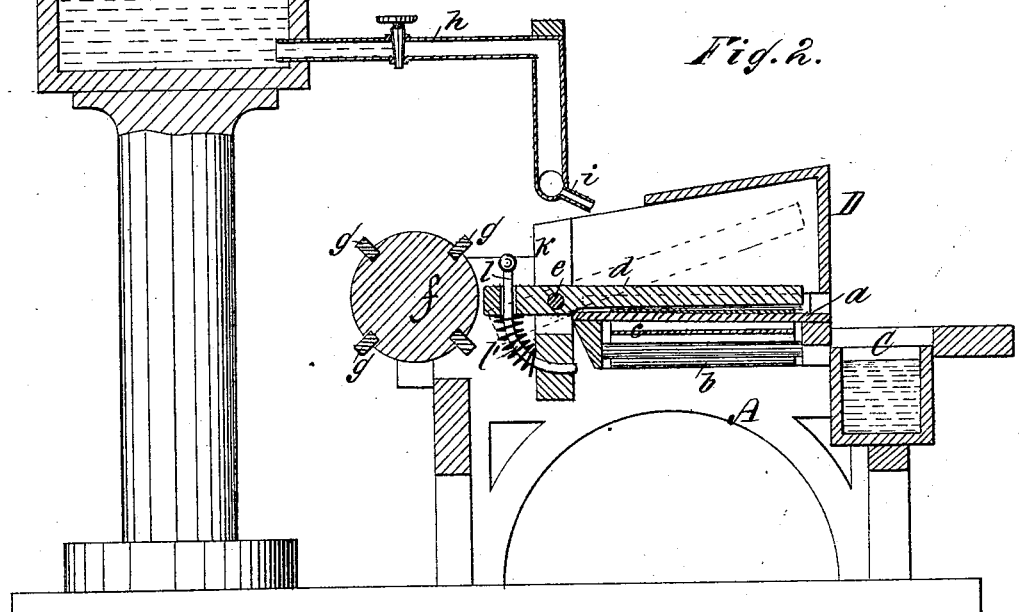

Figure 1 is a plan view of the machine, and Fig. 2 is a vertical section on line *x x* of Fig. 1.

A is the frame, of suitable construction, provided with a closed bed, *a*, of suitable size for receiving the work.

*b b* are rollers fitted in suitable bearings at the ends of the frame, and carrying an endless belt or apron, *c*, of canvas or other flexible material, which extends above and below the bed *a*.

*d d* are beaters, of any suitable number, hung on a rod, *e*, fixed at the back of bed *a*, so that the beaters rest on the apron *c*, and *f* is a roller sustained on frame A, behind the beaters, and provided with pegs *g*, placed in spiral lines for contact with the rear ends of the beaters in succession. The shaft of roller *f* and one of the rollers *b* are connected by gearing, and the roller-shaft is provided with a pulley for application of power.

B is a tank, for containing hot water, elevated above the bed *a* and fitted with a pipe, *h*, that leads to a distributer, *i*, placed over the beaters *d* for the purpose of discharging the water in fine streams upon the hats being operated on. A cock is provided in pipe *h* for regulating the flow of water.

C is a trough fixed in front of bed *a* in position for receiving the water that runs from the bed, and also for use in wetting the hats previously to their being placed beneath the beaters.

D is a hood resting upon and covering the bed, so as to catch the water that is splashed by the beaters. This hood is hung by pivoted arms *k* on the supporting-rod *e* of the beaters, and wires *l*, from a cross-bar connecting the arms *k*, extend through the rear ends of the beaters, and are enlarged at their ends above the beaters. By this construction the hood D can be raised, and when lifted high enough will raise the beaters so that the hats can be readily got at, if necessary. Springs *l'* on the rods *l* serve to press the beaters downward.

In operation the hats are placed on the apron *c*, which carries them beneath the beaters; or they may be placed beneath the beaters by raising the hood. The beaters act upon the hats with rapid blows, similarly to the hand-beating operation, and remove the cotton rapidly and perfectly. During the operation the hats are kept hot and flexible by the constant stream of water, so that they are not injured by the beaters.

Either a reciprocating or a rotary carrier may be used with the beaters. I do not limit myself in that respect.

I am aware that it is old to employ a series of beaters acting upon the material carried by an endless apron, and that it is old to expose the material to a saturation or dampening process while being subjected to the beating operation.

Having thus fully described my invention, I claim as new and desire to secure by Letters Patent—

1. In a machine for beating up napped hats, the pivoted beaters *d*, with their inner ends guided upon the curved rods *l* and resting upon springs *l'*, arranged on said rods, in combination with the roller or shaft *f*, carrying spirally-arranged rows of pegs or projections *g*, as shown and described, and for the purpose set forth.

2. In a machine for beating up napped hats, the beaters *d*, pivoted upon the fulcrum *e* and with their inner ends apertured and guided upon the curved rods *l* and resting upon springs *l'*, arranged on the rods *l*, in combination with the roller or shaft $f$, carrying spirally-arranged rows of pegs or projections $g$, and the apron $c$, arranged under the beaters $d$ and geared to operate simultaneously with the roller or shaft $f$, substantially as and for the purpose set forth.

3. In a machine for beating up napped hats, the pivoted beaters $d$, with one end fitted to move upon the curved spring-encircled rods $l$, in combination with the hood D, having the arms $k$, to a connecting-piece of which are secured the rods $l$, said arms being pivoted upon the fulcrum-rod $e$ of the beaters, substantially as shown and described, and for the purpose set forth.

WILLIAM FRANK MARTIN.

Witnesses:
A. C. GATES,
CHAS. MOON.